United States Patent
Beale et al.

(10) Patent No.: US 6,797,223 B2
(45) Date of Patent: Sep. 28, 2004

(54) NON-STICK FOOD PROCESSING, DOMESTIC AND INDUSTRIAL EQUIPMENT AND PROCESS OF USING SAME

(75) Inventors: Scott A. Beale, Saratoga Springs, NY (US); Warren R. Hartwell, Rehoboth, MA (US); Paul E. Bartley, Riverside, RI (US)

(73) Assignee: WRH Industries, Ltd., Fall River, MA (US)

( * ) Notice: Subject to any disclaimer, the term of this patent is extended or adjusted under 35 U.S.C. 154(b) by 55 days.

(21) Appl. No.: 09/949,700

(22) Filed: Sep. 10, 2001

(65) Prior Publication Data

US 2003/0047838 A1 Mar. 13, 2003

(51) Int. Cl.$^7$ .............................. A23P 1/00; B29C 33/38
(52) U.S. Cl. ........................... 264/337; 99/324; 99/426; 106/38.2; 106/38.6; 249/134; 426/515; 426/523
(58) Field of Search ............................... 106/38.2, 38.6, 106/38.22; 249/134; 264/337; 99/372, DIG. 15, 324, 426; 426/515, 523

(56) References Cited

U.S. PATENT DOCUMENTS

| | | | | |
|---|---|---|---|---|
| 3,648,965 A | * | 3/1972 | Daddona | 249/134 |
| 3,662,693 A | * | 5/1972 | Dana | 264/299 |
| 4,592,887 A | * | 6/1986 | Bando et al. | 249/134 |
| 5,232,609 A | | 8/1993 | Badinier et al. | 249/102 |
| 5,316,716 A | * | 5/1994 | Sato et al. | 106/38.22 |
| 5,332,190 A | * | 7/1994 | Watanabe et al. | 249/134 |
| 5,632,924 A | | 5/1997 | Gics et al. | 249/111 |
| 6,133,359 A | | 10/2000 | Bate et al. | 524/430 |
| 6,197,359 B1 | | 3/2001 | Llorente Hompanera | 426/523 |
| 6,261,985 B1 | | 7/2001 | Hsu | 501/141 |
| 6,551,693 B1 | * | 4/2003 | Buffard et al. | 99/342 |

OTHER PUBLICATIONS

Web Page Describing a Deluxe Cookware Set From Web Site: www.productsfromtv.com/llorentecookware.htm.

* cited by examiner

Primary Examiner—James P. Mackey
(74) Attorney, Agent, or Firm—Heslin Rothenberg Farley & Mesiti P.C.

(57) ABSTRACT

Non-stick mold, tool or apparatus is used to convert a liquid or semi-solid material to an end product after the application of a predetermined temperature for a predetermined time. The non-stick mold, tool or apparatus includes a planar portion having at least one cavity. The cavity defined by a side wall that extends downwardly from the planar portion to a closed end. The non-stick mold, tool or apparatus is made from a blend of a fluoropolymer component and a food grade silicon rubber component.

13 Claims, 5 Drawing Sheets

NON-STICK FOOD PROCESSING, DOMESTIC AND INDUSTRIAL EQUIPMENT AND PROCESS OF USING SAME

FIELD OF THE INVENTION

This invention relates generally to a material blend to make non-stick cookware, although this invention is also applicable to make a variety of other food processing, domestic and industrial apparatus, tools or molds used to form end products that take the shape of the tool or mold after the subjection to a predetermined temperature for a predetermined time.

BACKGROUND OF THE INVENTION

Conventional cookware used in, for example, baking, is made from wood, steel, or aluminum, although other materials such as copper, glass or ceramics are used. However, these materials have many shortcomings. For example, wood harbors bacteria and black algae and cannot be properly sanitized. Wood and plastics cannot be used in the cooking or baking process because of the excessive heat required. Also, the downtime associated with cleaning these materials after use is a further disadvantage based on the amount of time and labor spent scrubbing the cookware. Further, a number of these pieces of cookware are needed for the different stages of baking, cooking and freezing.

Conventional cookware made from these materials also requires excessive flour, cornmeal, butter or oil be added prior to baking to avoid the food products from sticking after baking. These additives increase the fat content and reduce the health benefit of the foods. Parchment paper has also been used to avoid sticking, but is typically used once and thrown away causing environmental concerns.

Further, the removing and releasing of the food product from conventional cookware after baking occasionally results in substantial damage to the food products, especially when dealing with fragile bakery items such as muffins and certain breads. While removing these fragile bakery items from conventional cookware, utensils and other kitchen tools, such as a spatula, are sometimes required in addition to the butter or oil to remove them from the cookware. The use of these additional tools is cumbersome and may also damage the cookware.

As an alternative, an enamel or glazing composition has been applied to the surface of cookware for providing a non-stick coating. Conventional, non-stick coatings consist of a fluorocarbon layer such as polytetrafluoroethylene (PTFE) or silicone elastomer applied directly to a metal substrate. Such coatings, however, tend to degrade with use and, in some instances, the coating material flakes away from the substrate and into the food product. These coatings also require re-application periodically, e.g. every six months, to maintain their non-stick properties.

Another alternative to conventional cookware uses a composition of fabric materials consisting of woven, knitted or non-woven fibers of glass fibers, carbon fibers, or ceramic fibers impregnated and coated with food grade silicones as disclosed in U.S. Pat. No. 5,232,609 assigned to ETS Guy DeMarle of Pont-Remy, France. Such material, however, could potentially flake off into the food product and cause a serious health hazard.

SUMMARY OF THE INVENTION

The shortcomings of the prior art may be alleviated by using the apparatus made from the material blend of a fluoropolymer component and a silicone rubber component in accordance with one or more principles of the present invention. The apparatus of the present invention may be used in the baking industry, confectionary industry, delicatessen trade or other food processing trade or industry. The apparatus formed by this blend may also be used in other domestic and industrial applications to form products that take the shape of the mold, such as, for example, ice cubes, candles, soap, pet biscuits, certain types of castings, or the like. Additionally, other uses may be made of the invention which fall within the scope of the claimed invention but which are not specifically described herein.

In one aspect of the invention, there is provided a non-stick apparatus for forming a viscous material into an end product after subjection to a predetermined temperature for a predetermined time. The apparatus comprises a planar portion having at least one cavity. The at least one cavity is defined by a side wall extending downwardly from the planar portion towards a closed end. The side wall and the closed end receives the viscous material and defines the end product of the viscous material after the subjection to the predetermined temperature for the predetermined time. The planar portion, the side wall and the closed end are integrally formed from a blend consisting essentially of a fluoropolymer component and a silicone rubber component.

In one embodiment, the blend comprises less than 70% by weight of the silicone rubber component. In an alternate embodiment, the blend comprises less than 65% by weight of the silicone rubber component. In yet another embodiment, the blend comprises 0% by weight of the silicone rubber component.

In another aspect of the invention, there is provided a process for converting a liquid or semi-solid material to an end product. The process comprises at least partially filling a cavity of an apparatus with said liquid or semi-solid material. The apparatus comprises a planar portion which defines the cavity. The cavity is further defined by a side wall extending downwardly from the planar portion towards a closed end. The planar portion, the side wall and the closed end are integrally formed from a blend consisting essentially of a fluoropolymer component and a silicone rubber component. The process further comprises subjecting the at least partially filled apparatus to a predetermined temperature for a predetermined time, whereby said liquid or semi-solid is converted to the end product.

Additional advantages are provided using the blend of fluoropolymer and silicone rubber. Tools, molds, trays, cookware or the like formed from this material blend are reusable and provide non-stick properties eliminating the need for oil, butter or other non-stick additives. The use of this material blend also eliminates the transfer of odors or taste, or other contaminates, to the ultimate product being formed by the apparatus formed by the blend.

Additional features and advantages are realized through the techniques of the present invention. Other embodiments, applications and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features and advantages of the invention are apparent from the following detailed description taken in conjunction with the accompanying drawings in which:

DETAILED DESCRIPTION OF THE EMBODIMENTS OF THE INVENTION

Figure 1:
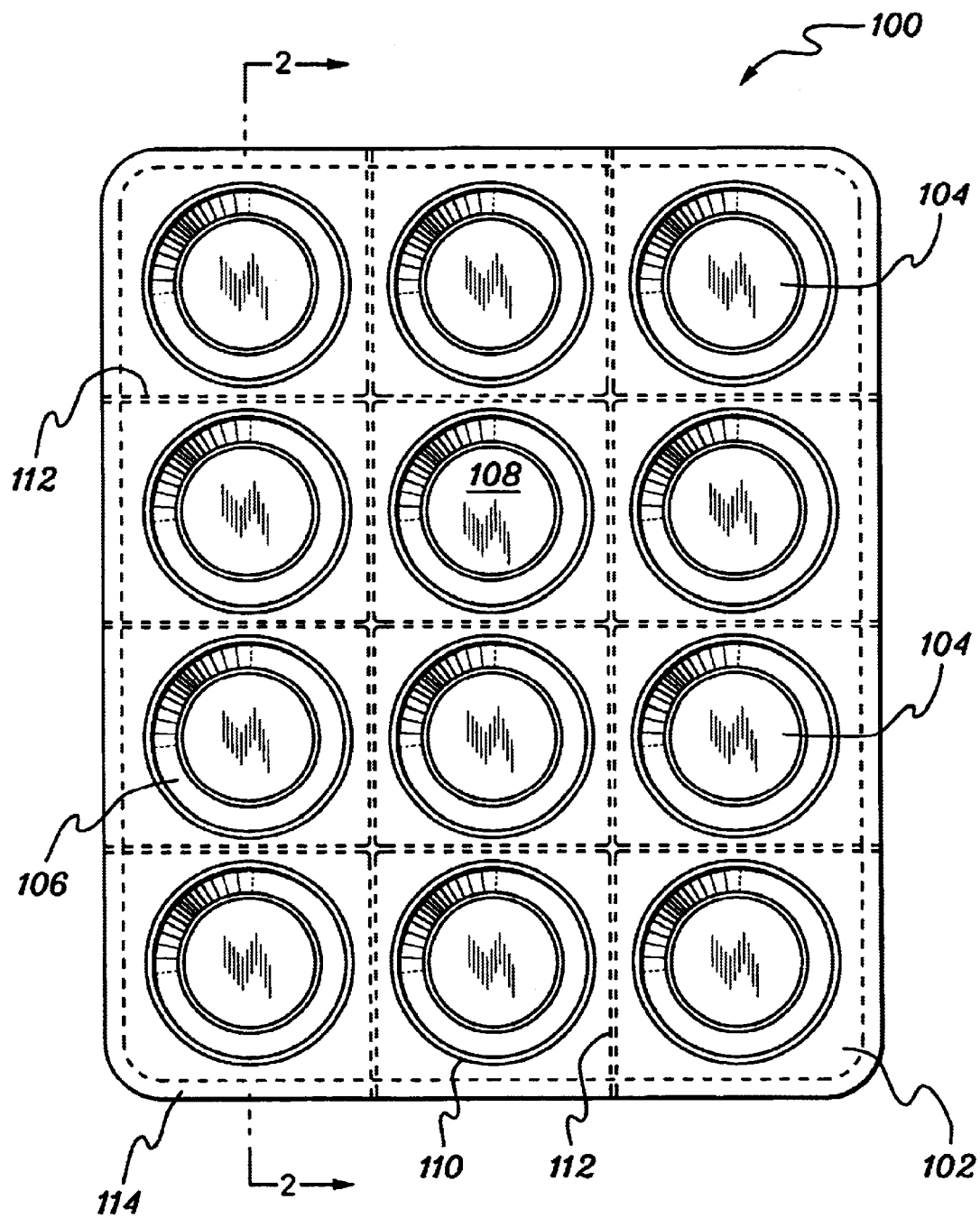
FIG. 1 depicts a top view of a muffin tray made in accordance with the principles of the present invention.

The present invention provides a blend of a fluoropolymer component and a silicone rubber component molded into a durable and flexible apparatus for forming viscous materials into a predetermined shape after subjecting to a predetermined temperature for a predetermined time. The apparatus is especially adapted for proofing, cooking or baking and freezing dough-based products, such as, for example, breads, muffins, baguette rolls or the like, which requires the formation of products based from an initial batter prior to heating or baking.

Although, the field of use of the apparatus is not limited to bread making and may extend to other culinary fields such as, for example, confections, which include starch casting for producing jellybeans, marshmallow casting, chocolate casting, casting confectionary hollow goods, shell castings, gum drops (e.g. jelly fruit slices), solid chocolate shapes, pies, donuts and other pastries, or the like. The apparatus may also be used in the delicatessen trade which includes, for example, quiches, tarts, meat pies, or the like. Other food processing uses of the apparatus include making gelatin and filled gelatins, baking, curing and processing loaf style meats, casting pet biscuit products such as, for example, dog milk bones, and molding frozen products, such as for example, popsicles, ice cream bars and ice cubes The apparatus may also be used for other domestic or industrial applications, such as, for example, making soap, candles, deodorant or other personal hygiene products, concrete castings including, for example imprinting decorative designs, ornamental castings of various substances such as, for example, wood pulp or polyester slurry, or the like.

For the purpose of convenience only, the apparatus will be described with reference to baking apparatus, such as, for example, trays, containers and other food handling and processing apparatus used to bake bread products, but it should be understood that the apparatus also extends to a wide variety of other food processing, and domestic and industrial applications.

The apparatus made in accordance with the present invention is made from a blend of at least one fluoropolymer and at least one food grade silicone rubber.

Fluoropolymers have excellent high temperature stability, low surface energies resulting in non-stick properties, and good flexibility. The fluoropolymer component of the blend may be a single fluoropolymer or a blend of two or more fluoropolymers. The term "fluoropolymer" is defined herein as a material which is predominantly prepared from fluorinated monomers (greater than 60%); copolymers containing minority components of a non fluorinated monomer are also encompassed by the term. Suitable fluoropolymers include polytetrafluoroethylene (PTFE), polychlorotrifluoroethylene, copolymers containing vinylidene fluoride and copolymers of polytetrafluoroethylene, polytetrafloroethylene with small amounts of comonomers such as hexafluoropropylene, chlorotrifluoro-ethylene, perfluoroalkylvinylethers, or vinylidene fluoride, such as PFA or MFA (copolymers of tetrafluoroethylene and perfluoroalkylvinylethers); FEP (copolymers tetrafluoroethylene and hexafluoropropylene), and ETFE (copolymers of ethylene and tetrafluoroethylene).

Any combination of the following monomers may be polymerized to form a suitable fluoropolymer matrix material: tetrafluoroethylene, chlorotrifluoroethylene, vinylidene fluoride, vinyl fluoride, hexafluoropropylene, perfluoroalkylvinylether, ethylene, propylene, non-fluorinated alkyvinylethers, and vinyl esters. In addition, fluoroelastomers may also be used alone, or as a component of a fluoropolymer blend. Fluoroelastomers may be prepared from the combinations of the following monomers: vinylidene fluoride, hexafluoropropylene, tetrafluoroethylene, CTFE, ethylene, propylene, perfluoroalkylvinylether, alkylvinylether.

Fluoropolymers, such as, for example, PTFE, may be shaped by compression where its chemical stability and non-wettability make it suitable for use in extreme circumstances such as heat and freezing. When used with food products, PTFE adds or transfers nothing to the foods, such as additives, to compromise or contaminate the flavor or odor, and takes nothing away such as absorbing dilute solutions of benzoic acid and other common food preservatives so that the same apparatus may be reused for a variety of different food products. PTFE also complies with FDA regulations as a material for direct contact with meat or poultry food products. Products made from PTFE can help reduce apparatus maintenance costs, increase uptime, increase throughput and safeguard product purity.

Silicone rubber is part of a family of specialty synthetic silicone elastomers that provide a unique balance of chemical and mechanical properties. Silicone rubber excels in such areas as high temperature stability, low temperature flexibility, chemical resistance, weatherability, electrical performance and sealing capability. Because of its relative purity and chemical composition, silicone rubber displays exceptional biocompatibility, making it an attractive choice for many health care, pharmaceutical and food applications.

Based on the total weight, the blend forming the apparatus of the present invention most preferably contains about 40% by weight of fluoropolymer, such as, for example, PTFE, and about 60% by weight of silicone rubber. The amount of silicone rubber used in the composition is preferably below 70% and, more preferably, below 65%. Any amount of silicone rubber under these percentages by weight of the blend would also be suitable.

Although an apparatus made from 100% PTFE is preferred, the major drawback of PTFE is its cost. Too much silicone rubber, however, causes silicone oil to raise or bloom to the surface of the apparatus during heating which can potentially transfer to and contaminate the product being heated. Also, silicone rubber tends to dry out at high temperature.

The blend may also contain one or more additives or fillers such as, for example, silica, mica, talc, titanium dioxide, asbestos, clay, carbon black, and alumina. Based on the total weight, the blend forming the apparatus of the present invention may contain less than about 30% by weight of filler material, more preferably, less than about 20% by weight of filler and most preferably less than about 15% by weight of filler material. Additives such as, for example, pigments and dyes may also be used. Too much of these fillers or additives may effect the non-stick properties of the apparatus and caution should be taken in choosing the filler to assure that nothing harmful can transfer or contaminate the end product, especially when the end product is food. In the illustrative embodiments shown in FIGS. 1–3, the apparatus consisting of the fluoropolymer and silicone rubber blend may be an article of cookware such as, for example, muffin tray 100 or baguette tray 300 used to bake muffins or baguette or sub rolls, respectively. The cookware may include at least one baking well, cavity or channel for receiving a portion of a viscous material. The wells, cavities or channels of the cookware correspond to and define the shapes and sizes of the end product to be formed by baking or heating or freezing, in the case of, for example, ice cubes and chocolate. The predetermined temperatures and times required to, for example, bake muffins, freeze ice, make candles or the like are well know and publically available from most cookbooks or hobby books. Depending on the use of the apparatus, the predetermined temperature may be any temperature, such as, for example, high temperature (e.g. 350 Deg. F.), around or below freezing, or room temperature.

It is understood by those skilled in the art that the arrangement of the wells, cavities or channels in the cookware may be selected in a variety of ways. Suitable arrangements include, for example, one to three rows of two to six baking wells. Although, additional rows and baking wells may be added as long as the structure of the cookware is stable enough for transfer and handling.

In general, the end product derives first from a viscous material introduced into the wells, cavities or channels prior to subjecting the viscous material and apparatus to a predetermined temperature for a predetermined time. The term "viscous material" is defined herein as a flowing mixture of ingredients which is subjected to a desired temperature (e.g. high temperature with baking, low temperature with freezing, room temperature for gelatin) for a predetermined time in order to form the end product. The mixture of ingredients may be, for example, a liquid or semi-solid material while the end product may be a solid or semi-solid product. For example, with respect to baking, the viscous material is batter which includes a flowing mixture of flour, milk, and eggs for making bread, muffins, pancakes, or the like. With respect to the delicatessen trade, for the purpose of this application, the viscous material may include a mixture of ground beef, ketchup and onions for making meat pies or meat loaf. Other viscous materials that may be introduced into the apparatus are, for example, wax for making candles, water for making ice cubes, syrup from cacao seeds and water for making chocolate, water and sand mixture for making concrete, and the like.

Figure 2:
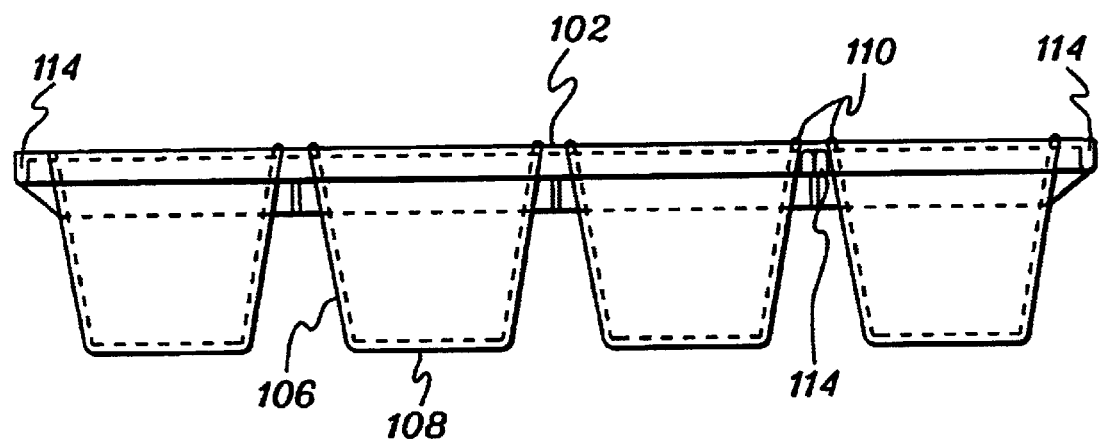
FIG. 2 depicts a cross-sectional view taken along the line 2—2 of the muffin tray depicted in FIG. 1.
Figure 4:
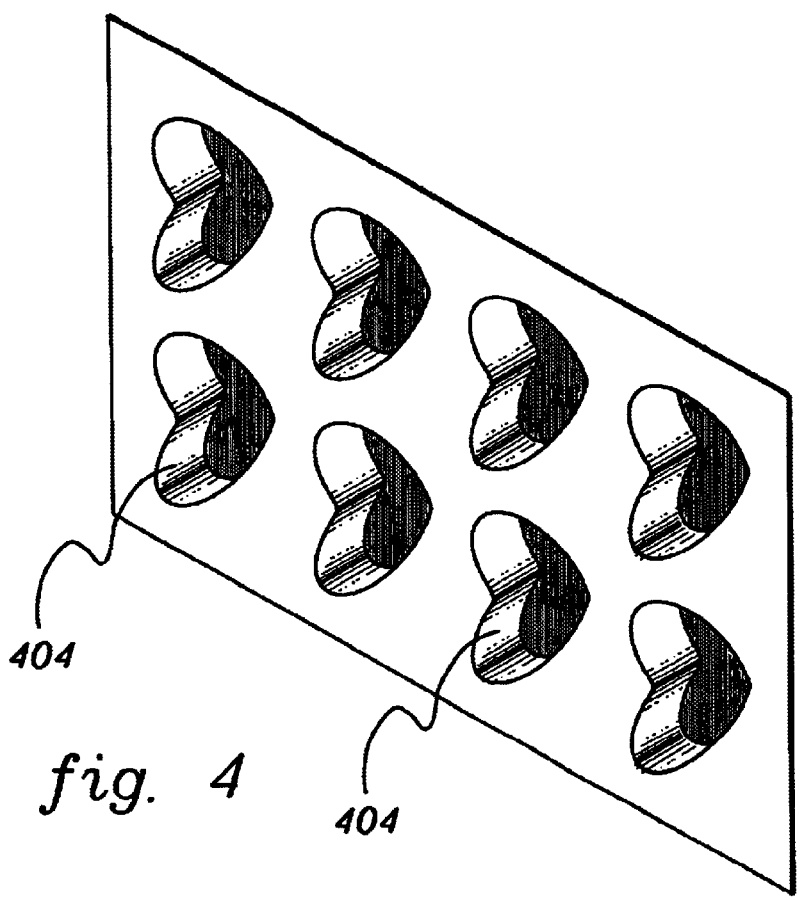
FIG. 4 depicts a perspective view of another embodiment illustrating hear-shaped cavities or wells made in accordance with the principles of the present invention.

In the illustrative embodiment shown in FIGS. 1 and 2, muffin tray 100 includes a generally planar portion 102 from which a plurality of baking wells 104 for housing the batter to make muffins, or other food products, protrude downwardly. In alternate embodiments, baked goods of other shapes (e.g. heart-shaped as illustrated in FIG. 4), sizes, and designs may be used by simply modifying the shape and size of the cavities, wells or channels in, for example, the injection molded means used to fabricate the cookware.

Each baking well 104 includes a side wall 106 extending downwardly from planar portion 102. In the embodiment illustrated in FIG. 1, side walls 106 are frustoconical with the larger end opening upwardly. In alternate embodiments, the side walls may be vertical or more slanted towards the center of the cavity. Side walls 106 blend into a closed end 108 formed as a geometrically shaped bottom surface which closes the bottom of baking well 104. This bottom surface 108 is made into the same shape as baking well 104, such as, for example, a circle, as illustrated in FIG. 1.

The top edge of each side wall 106 may be completely surrounded by a vertically extending protrusion or ridge 110 that protrudes above the surface of planar portion 102 of muffin tray 100. Ridge 110 completely encircles the top edge of side wall 106. Planar portion 102 may also include additional ridges 112 spaced from, but still surrounding the top edge of side wall 106. Ridges 112 may form a grid-like pattern over the entire surface of planar portion 102 around all of baking wells 104. This grid-like ridge 112 may protrude either above or below planar portion 102. Planar portion 102 may also include a ridge 114 extending around the outer periphery or edge of muffin tray 100. This ridge 114 may protrude either above or below planar portion 102. Ridges 110, 112 and 114 reinforce muffin tray 100 and significantly contribute to the structural stability of the tray during baking, transfer and handling.

During use, the wells, cavities or channels may be turned inside out by pressing upwardly on the bottom surface of the closed end of the tray in order to eject or otherwise remove the food product from the well or cavity. The elastromeric and flexible properties of the material blend of the apparatus enables the wells or cavities to be turned inside out. Therefore, after, for example, baking, the piece of baked batter (e.g. muffin) releases readily from each well or cavity because of the non-stick properties of the material blend and is further aided by the capability to turn the well or cavity inside out. For this reason, no oil, butter or other additives or parchment paper is needed to line or coat the batter or dough or cavities prior to inserting the batter or dough into the cavities. Therefore, the health benefit of the baked product is increased and a step in baking is eliminated. Further, the cost of the oil, butter or other additive is also eliminated.

Figure 3:
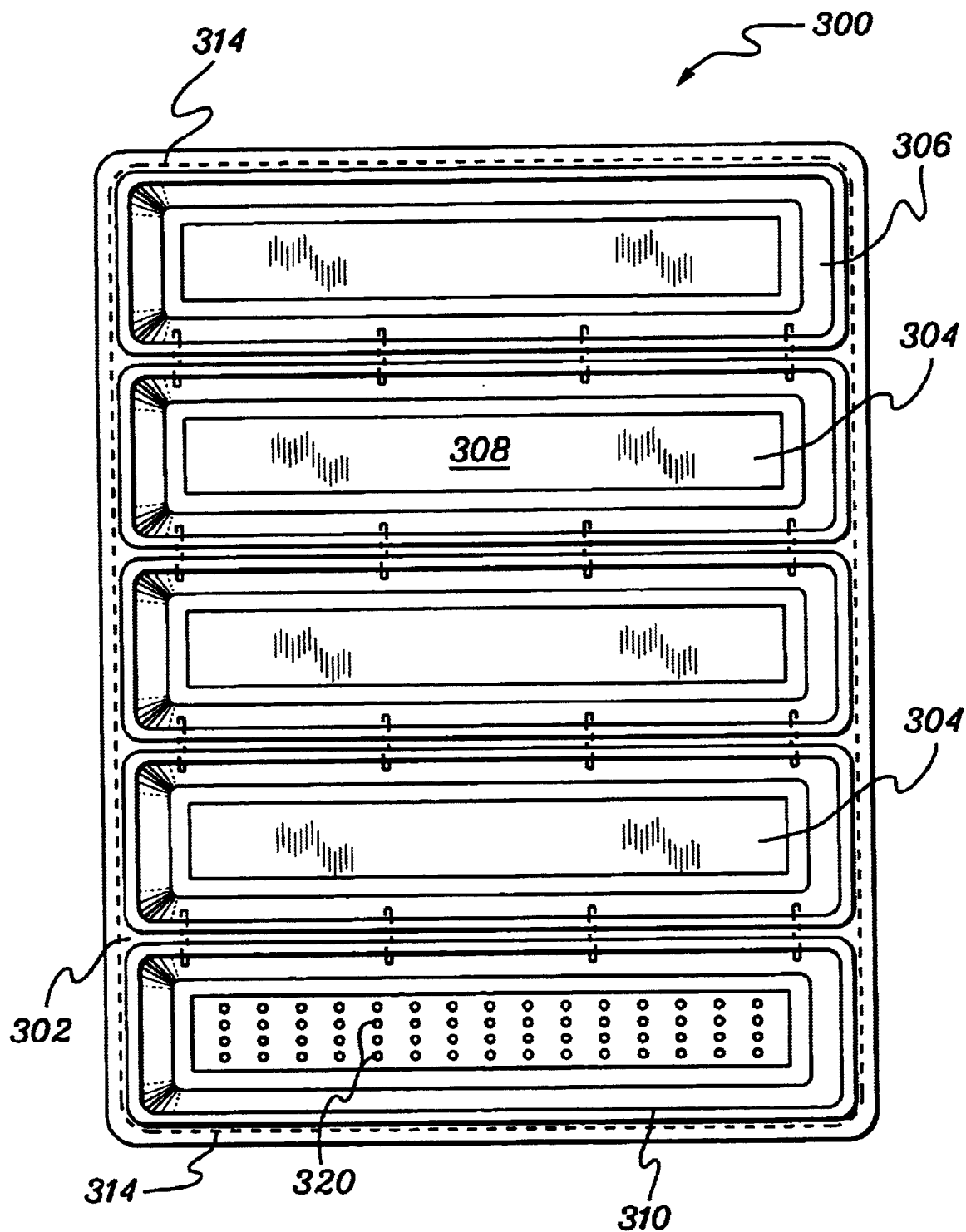
FIG. 3 depicts a top view of a baguette tray made in accordance with the principles of the present invention.

The illustrative embodiment in FIG. 3 depicts a baguette tray 300 made in accordance with the principles of the present invention used to bake baguette or sub rolls. Baguette tray 300 includes a generally planar portion 302 from which a plurality of rectangular-shaped baking channels 304 protrude downwardly. Although, the apparatus made from the blend of the present invention are not limited to tray having a plurality of wells or cavities. The apparatus may include, for example, a circular pie plate for making a single pie.

Baking channels 304 include side walls 306 extending downwardly from planar portion 302. Side walls 306 slant downwardly from planar portion 302 towards closed end 308 forming a bottom surface which closes the bottom of baking channel 304. The top edge of each side wall 306 is surrounded by a ridge 310 that protrudes above the surface of planar portion 302 of baguette tray 300. Ridge 310 completely surrounds the top edges of side walls 306. Baguette tray 300 also includes ridge 314 extending around the outer periphery or edge of the tray. Ridges 310 and 314 reinforce the tray and significantly contribute to the structural stability of the tray during baking, transfer and handling.

The bottom surfaces of the wells, cavities or channels may also include a plurality of ventilating holes, as illustrated by ventilating holes 320 in baguette tray 300 of FIG. 3, to permit hot air to pass through during baking in order to aid in the heat transfer properties of the tray.

Figure 5:
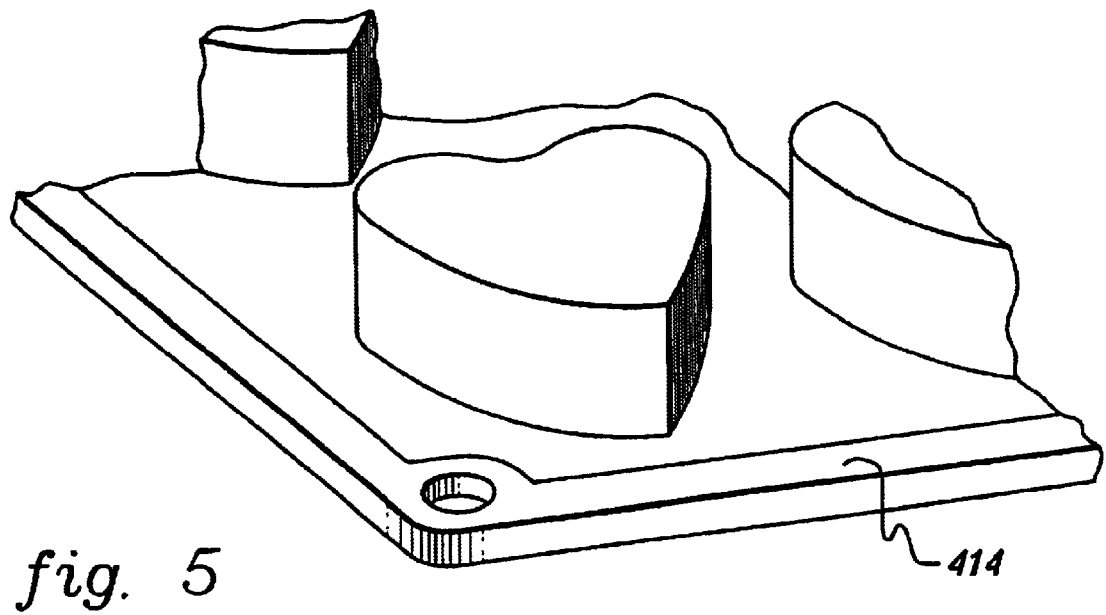
FIG. 5 depicts a perspective view of the bottom side of the embodiment depicted in FIG. 4 illustrating the structural ridge surrounding the outer edge.
Figure 6:
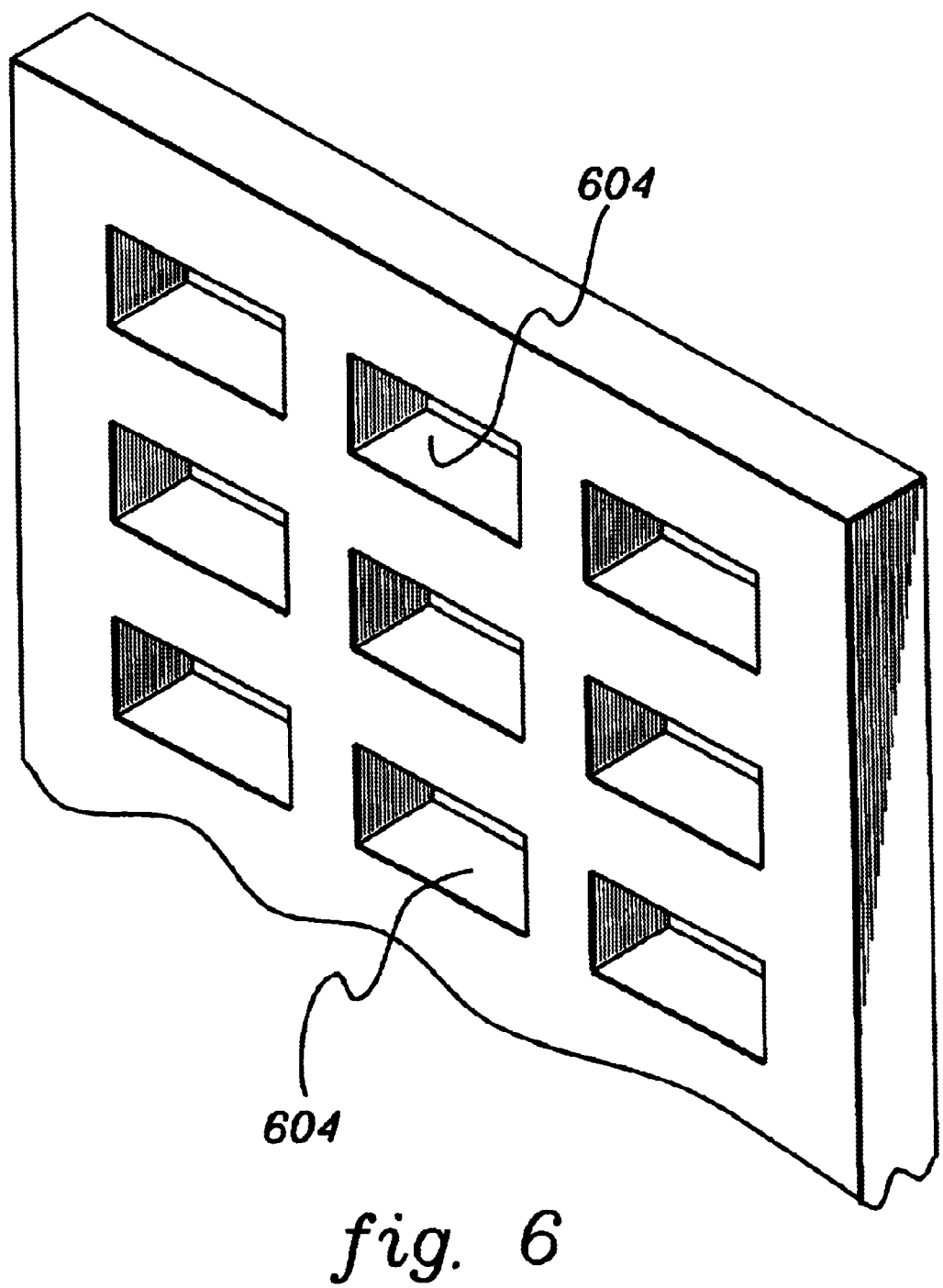
FIG. 6 depicts a perspective view of another embodiment made in accordance with the principles of the present invention.

FIGS. 4–6 illustrate alternative embodiments of the apparatus made from the blend in accordance with the principles of the present invention. For example, FIGS. 4–5 illustrate heart-shaped cavities 404 and ridge 414 extending around the outer periphery or edge of the tray. FIG. 6 illustrates an arrangement of a three cavities or wells 604 in a number of rows for baking small loaves of bread or small cakes.

Cookware, or other apparatus, made from the blend in accordance to the present invention offers significant improvements relative to known conventional cookware, and other domestic and industrial tools, molds and apparatus. For example, the apparatus provides excellent non-stick properties, eliminating the need for oil, butter or other additives or parchment paper previously used to prevent batter or the end product from sticking to the apparatus. The apparatus does not transfer odors or any additives to the end product. This apparatus also minimizes the length of time to clean the cookware after use, thus, decreasing the downtime during baking. Moreover, this apparatus allows an exact shape to be produced without damage to the end product because the apparatus provides excellent release ability from the cavity in which it was formed during heating or freezing. Also, the apparatus may be reused and put in both the oven, refrigerator and freezer making it suitable for proofing, baking and freezing.

The apparatus may be formed by injection molding means, such as, for example, compression injection molding. In compression molding, a predetermined amount of the blend is introduced into the mold. This introduction of the blend into the mold may be aided by supercritical Nitrogen or carbon dioxide which modifies the flow characteristics of the material to become easily moldable. Shortly after closing the mold, it is often opened slightly to vent gases, steam and air, and then it is closed again until curing takes place which typically takes from one to five minutes. Injection molding, including compression injection molding is a process well known in the art. The advantages of compression molding are that there is little or no material loss, fillers do not become oriented, and internal stresses are minimum.

Although preferred embodiments have been depicted and described herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A non-stick apparatus for forming a viscous material into an end product after subjection to a predetermined temperature for a predetermined time, said apparatus comprising:
a planar portion having at least one cavity, the at least one cavity defined by a side wall extending downwardly from the planar portion towards a closed end, the side wail and the closed end receiving the viscous material and defining the end product of the viscous material after the subjection to the predetermined temperature for the predetermined time, said apparatus formed substantially in its entirety of a blend consisting essentially of a fluoropolymer component and a silicone rubber component.

2. The apparatus of claim 1, wherein the fluoropolymer component is polytetrafluoroethylene.

3. A non-stick apparatus for forming a viscous material into an end product after subjection to a predetermined temperature for a predetermined time, said apparatus comprising:
a planar portion having at least one cavity, the at least one cavity defined by a side wall extending downwardly from the planar portion towards a closed end, the side wall and the closed end receiving the viscous material and defining the end product of the viscous material after the subjection to the predetermined temperature for the predetermined time, the planar portion, the side wall and the closed end being integrally formed from a blend consisting essentially of a fluoropolymer component and a silicone rubber component, wherein the blend comprises less than 70% by weight of the silicone rubber component.

4. A non-stick apparatus for forming a viscous material into an end product after subjection to a predetermined temperature for a predetermined time, said apparatus comprising:
a planar portion having at least one cavity, the at least one cavity defined by a side wall extending downwardly from the planar portion towards a closed end, the side wall and the closed end receiving the viscous material and defining the end product of the viscous material after the subjection to the predetermined temperature for the predetermined time, the planar portion, the side wall and the closed end being integrally formed from a blend consisting essentially of a fluoropolymer component and a silicone rubber component, wherein the blend comprises less than 65% by weight of the silicone rubber component.

5. The apparatus of claim 1, wherein the planar portion, side wall and closed end further include a filler component.

6. The apparatus of claim 1, wherein the planar portion has a plurality of cavities spaced from one another in the planar portion.

7. A flexible and foldable non-stick article of cookware, said article of cookware formed substantially in its entirety of a blend of a fluoropolymer component and a silicone rubber component.

8. A non-stick apparatus for forming a viscous material into a shape after subjection to a desired temperature for a predetermined time, said apparatus formed substantially in its entirety of a blend of a fluoropolymer component and a silicone rubber component.

9. The apparatus of claim 8, wherein the fluoropolymer component is polytetrafluoroethylene.

10. A process for converting a liquid or semi-solid material to an end product, said process comprising:
at least partially filling a cavity of an apparatus with said liquid or semi-solid material, the apparatus comprising a planar portion which defines the cavity, the cavity further defined by a side wall extending downwardly from the planar portion towards a closed end, said apparatus formed substantially in its entirety of a blend consisting essentially of a fluoropolymer component and a silicone rubber component; and
subjecting the at least partially filled apparatus to a predetermined temperature for a predetermined time; whereby said liquid or semi-solid is converted to the end product.

11. A process for converting a liquid or semi-solid material to an end product, said process comprising:
at least partially filling a cavity of an apparatus with said liquid or semi-solid material, the apparatus comprising planar portion which defines the cavity, the cavity further defined by a side wall extending downwardly from the planar portion towards a closed end, the planar portion, the side wall and the closed end being integrally formed from a blend consisting essentially of a fluoropolymer component and a silicone rubber component, wherein the blend comprises less than 70% by weight of the silicone rubber component; and subjecting the at least partially filled apparatus to a predetermined temperature for a predetermined time;

whereby said liquid or semi-solid is converted to the end product.

12. A process for converting liquid or semi-solid material to an end product, said process comprising:

at least partially filling a cavity of an apparatus with said liquid or semi-solid material, the apparatus comprising a planar portion which defines the cavity, the cavity further defined by aside wall extending downwardly from the planar portion towards a closed end, the planar portion, the side wall and the closed end being integrally formed from a blend consisting essentially of a fluoropolymer component and a silicone rubber component, wherein the blend comprises less than 65% by weight of the silicone rubber component; and subjecting the at least partially filled apparatus to a predetermined temperature for a predetermined time;

whereby said liquid or semi-solid is converted to the end product.

13. The process of claim 10, wherein the planar portion, side wall and closed end further include a filler component.

* * * * *

UNITED STATES PATENT AND TRADEMARK OFFICE
CERTIFICATE OF CORRECTION

PATENT NO. : 6,797,223 B2
DATED : September 28, 2004
INVENTOR(S) : Beale et al.

It is certified that error appears in the above-identified patent and that said Letters Patent is hereby corrected as shown below:

Column 7,
Line 59, delete the word "wail" and insert -- wall --

Signed and Sealed this

First Day of February, 2005

JON W. DUDAS
*Director of the United States Patent and Trademark Office*